Feb. 26, 1963  G. E. GOLLWITZER ET AL  3,079,011
MATERIAL DEPILING AND HANDLING APPARATUS
Filed Oct. 6, 1960  5 Sheets-Sheet 1
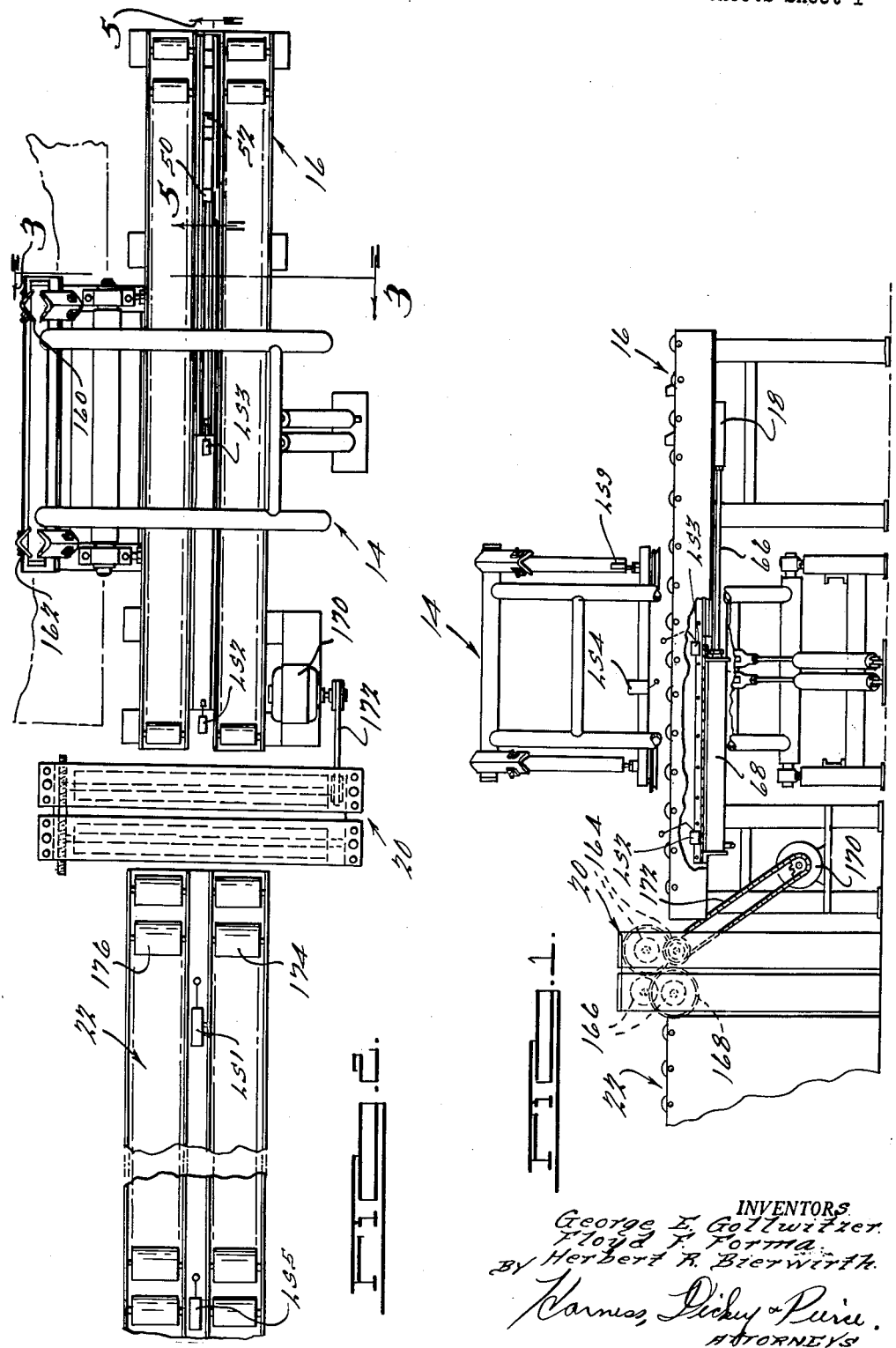
INVENTORS.
George E. Gollwitzer
Floyd F. Forma
Herbert R. Bierwirth
BY Harness, Dickey & Pierce
ATTORNEYS

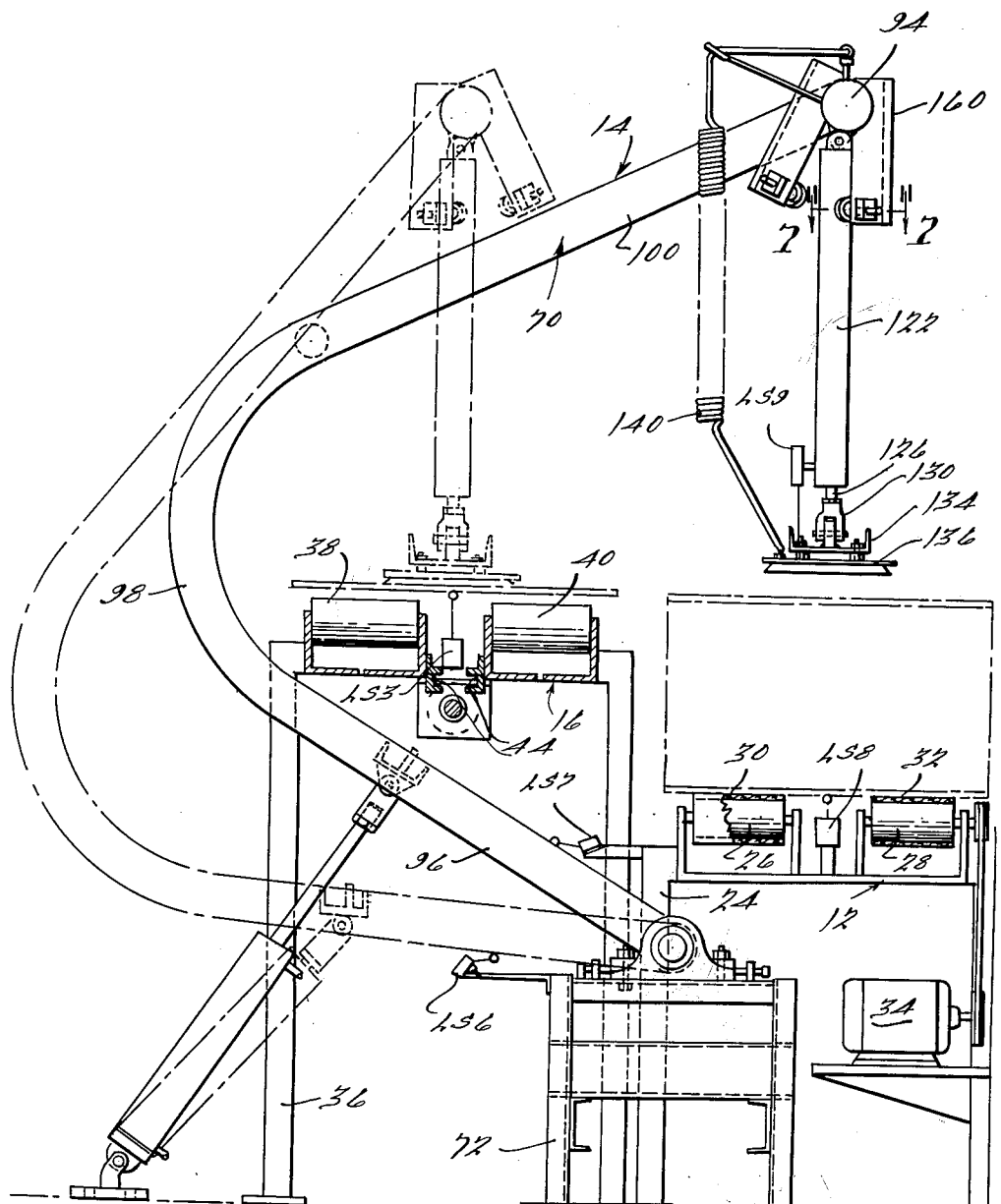

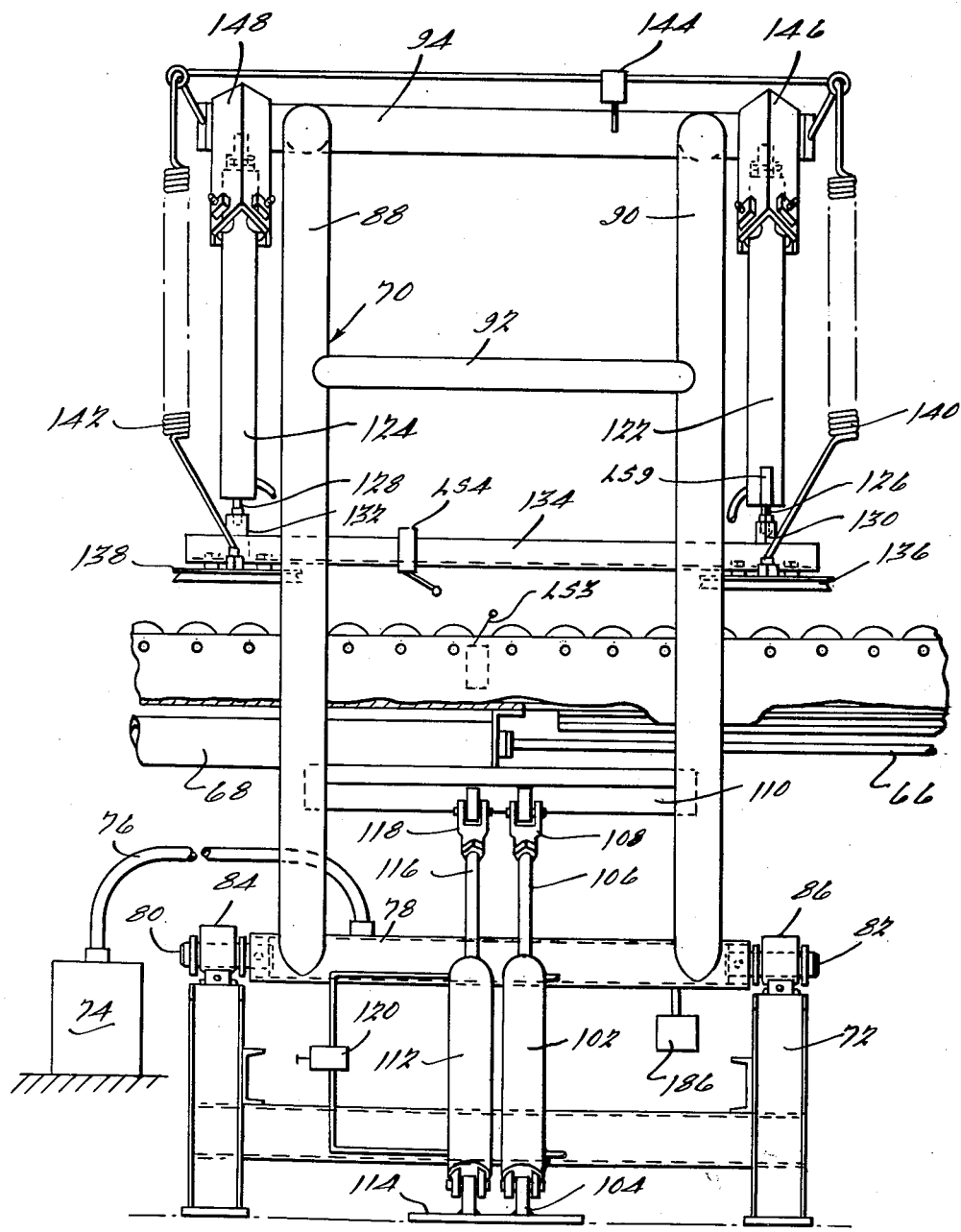

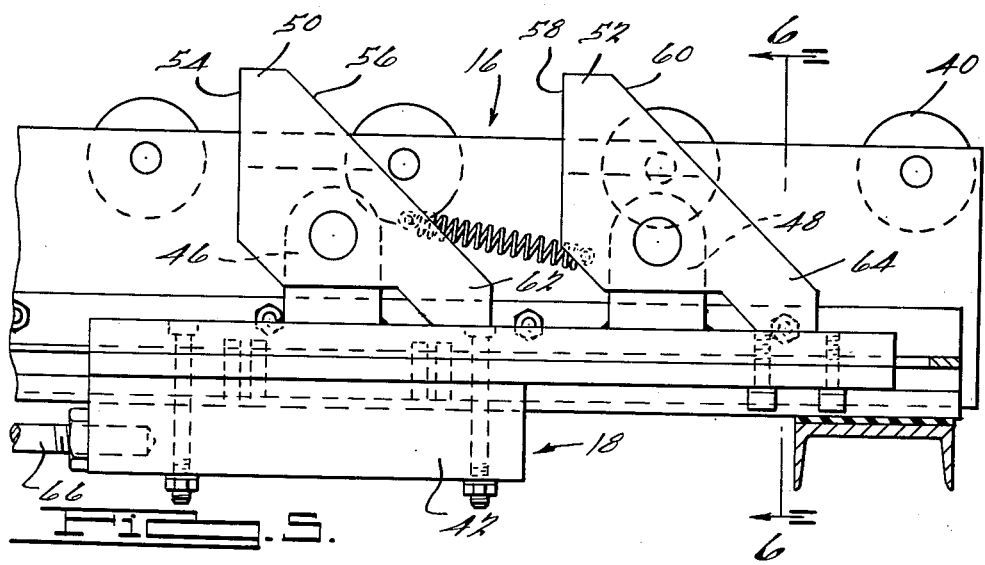
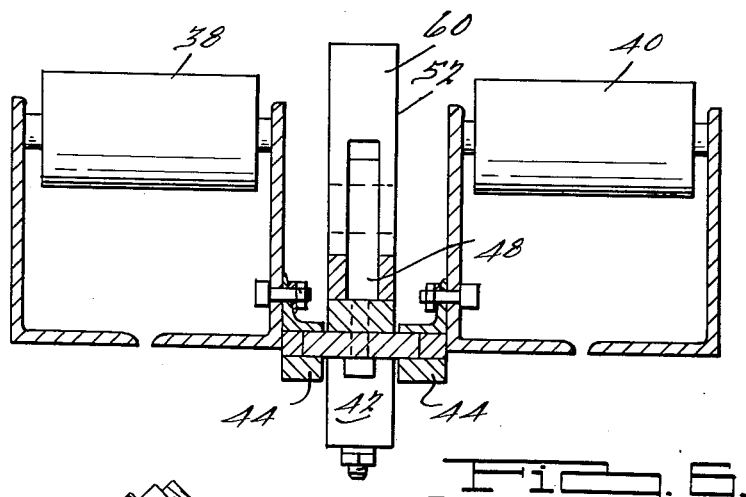
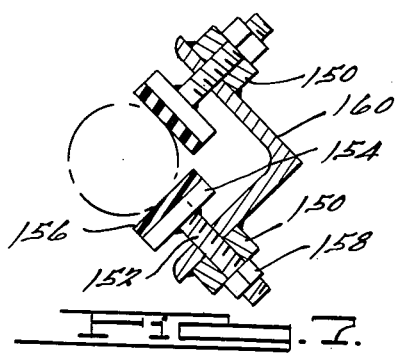

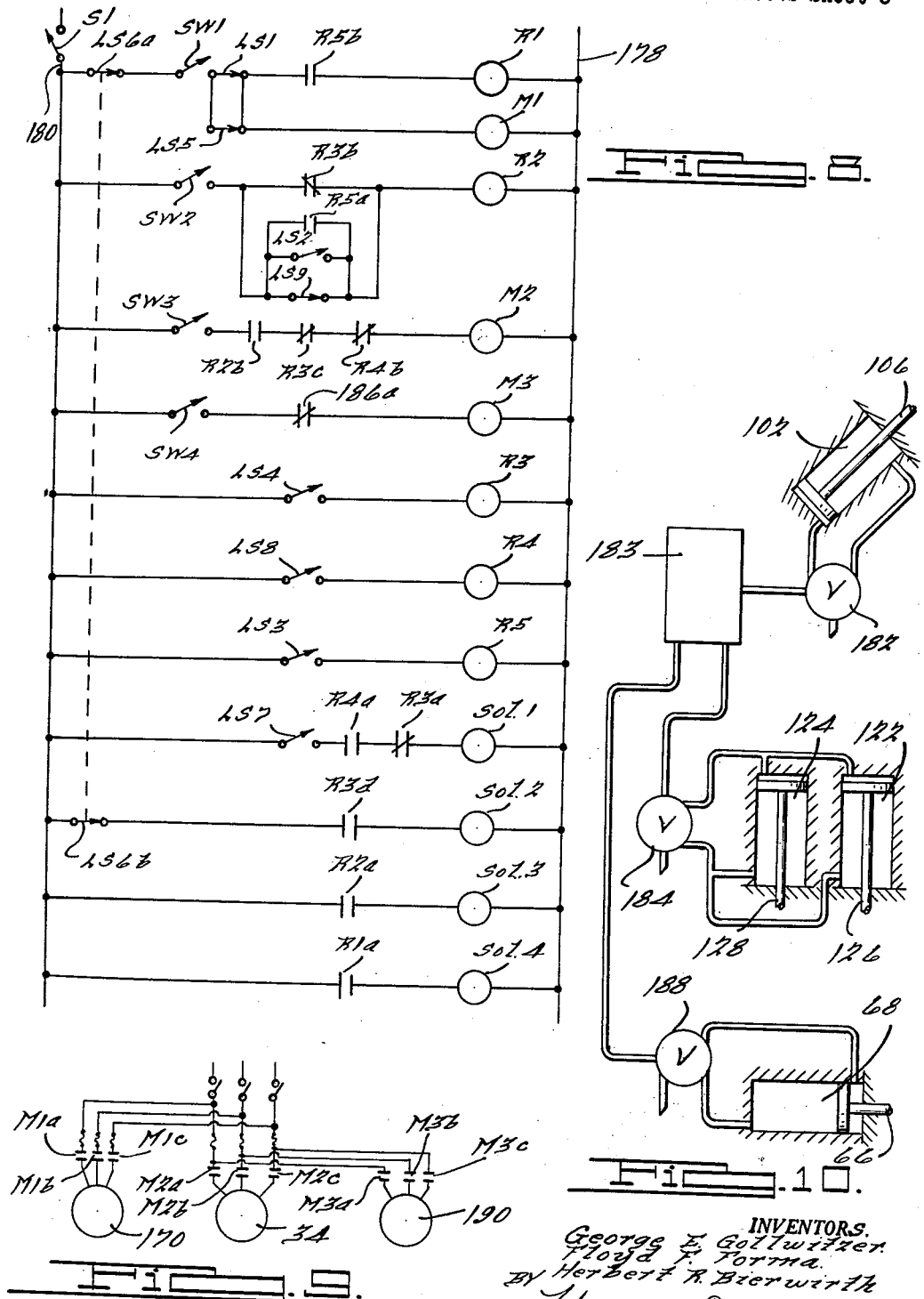

United States Patent Office 3,079,011
Patented Feb. 26, 1963

3,079,011
MATERIAL DEPILING AND HANDLING
APPARATUS
George E. Gollwitzer, Mount Vernon, and Floyd F. Forma and Herbert R. Bierwirth, Pittsburgh, Pa., assignors to Kelsey-Hayes Company, Detroit, Mich., a corporation of Delaware
Filed Oct. 6, 1960, Ser. No. 60,935
6 Claims. (Cl. 214—1)

This invention relates to a material handling apparatus and particularly to a mechanism for successively and individually removing pieces of material from a stack and depositing the pieces in a selected position adjacent the stack.

It is an object of the present invention to provide a material handling apparatus of the above character which is particularly suited for the handling of large, somewhat elongated pieces of sheet material, as, for example, sheet steel.

It is another object of the present invention to provide a work handling apparatus of the above character which is relatively simple and inexpensive in construction, yet which is ruggedly built and highly reliable in operation.

It is still another object of the present invention to provide a work handling apparatus of the above character which avoids the necessity for utilizing overhead cranes or other ceiling suspended apparatus but which is relatively compact in size, is entirely floor supported and presents a minimum obstruction to the movement of workmen and use of adjacent floor space.

It is a still further object of the present invention to provide a work handling apparatus of the above character which is operable to transfer the sheets with a minimum usage of power yet which is effective to cleanly lift the sheets off of the pile, move the sheet over a given new location and accurately deposit the sheet into position in the new location.

It is still another object of the present invention to provide a work handling apparatus of the above character utilizing a tiltable rocker frame and vacuum operated suction cups for lifting the sheets having improved means providing a vacuum chamber adapted to be placed in communication with the suction cups.

It is still another object of the present invention to provide a work handling device of the above character which is operable to successively raise the uppermost sheet from the pile and move it to a selected location, yet will automatically return to pick up a sheet in the event that a sheet is accidentally dropped and which will delay its operation if the sheet receiving location is not in a condition ready to receive a new sheet.

It is a still further object of the present invention to provide a work handling mechanism which is particularly suited for the depiling of sheet steel and the individual handling of sheets through a roller coater mechanism preparatory to the working of the sheets in a die press.

These and other objects of the present invention will become apparent from the following detailed description taken in conjunction with the accompanying drawings wherein:

FIGURE 1 is a front elevational view with parts broken away of a work handling apparatus embodying the principles of the present invention;

FIG. 2 is a plan view of the structure shown in FIG. 1;

FIG. 3 is an enlarged sectional view of the structure illustrated in FIG. 2 taken along the line 3—3 thereof;

FIG. 4 is an enlarged rear elevational view of a portion of the structure shown in FIG. 1;

FIG. 5 is an enlarged sectional view of the structure shown in FIG. 2 taken along the line 5—5 thereof;

FIG. 6 is a sectional view of the structure shown in FIG. 5 taken along the line 6—6 thereof;

FIG. 7 is a sectional view of the structure shown in FIG. 3 taken along the line 7—7 thereof;

FIGS. 8 and 9 are wiring diagrams of a suitable control mechanism usable with the apparatus shown in FIGS. 1–7; and FIG. 10 is a diagrammatic view of the pneumatic power apparatus utilized with the structure shown in FIGS. 1–7.

Referring now to the drawings and particularly to FIG. 3, there will be seen a conveyor, generally indicated by the numeral 12, on which the stacks or piles of sheets are loaded and conveyed to a position adjacent to a transfer mechanism, generally indicated by the numeral 14. The mechanism 14 serves to individually and successively remove the uppermost sheet from the stack in said position and deposit it on a roller conveyor, generally indicated by the numeral 16. From the position in which they are deposited on the conveyor 16, the individual sheets are slidably moved therealong by a pusher mechanism, generally indicated by the numeral 18, to a first work performing station, as, for example, the roller coater mechanism, indicated by the numeral 20. From the roller coater mechanism 20 the sheets are delivered to a roller conveyor 22 from which location they may be removed by any suitable means, as for example, manually. While the exact construction of the several conveyors utilized with the transfer mechanism 14 is such as to permit the convenient arrangement of suitable limit switches, as will be hereinafter described, the conveyors per se and the work performing station 20 may be varied widely within the scope of the present invention. They are described herein for the principal purpose of illustrating a complete sequence of operations for the transfer mechanism 14 in which the transfer mechanism 14 is so controlled as to delay operation until a pile has been brought into its proper depiling position and the conveyors 16 and 22 are ready to receive a new sheet. While the transfer mechanism 14 and the conveyor 16 may be utilized to feed sheets to a variety of work performing stations, the roller coater 20 is particularly intended to provide sheet steel with a suitable coating preparatory to the working of the sheets in a die press (not shown) and the sheets may be manually or otherwise fed from the conveyor 22 directly into the press. It will be appreciated, however, that the sheets could be delivered directly from the conveyor 16 to a variety of machines for forming, coating, treating or other working of the material.

As shown in the drawings, the conveyor 12 includes a stand 24 on which are mounted two spaced rows of rollers 26 and 28 which provide a horizontal supporting structure for endless conveyor belts 30 and 32, respectively. The belts are driven by a motor 34, for the purpose of advancing stacks of sheets from a loading position thereon to a position in juxtaposition to the transfer mechanism 14. A limit switch LS8 is located between the belts 30 and 32 and is intended to have its actuating arm contacted by the lowermost sheet of the pile when a pile has been brought to the desired depiling position.

The conveyor 16 is arranged in parallel and closely spaced relation to the conveyor 12. The conveyor 16 includes a framework 36 which supports a pair of spaced rows of aligned rollers 38 and 40 on which the sheets are adapted to directly rest when delivered thereto by the transfer mechanism 14. A limit switch LS3 is positioned between the rows of rollers 38 and 40 in a position to have its actuating arm biased when a sheet is lowered onto the conveyor 16 by the transfer mechanism 14. In addition, a second limit switch LS2 is positioned between the rollers 38 and 40 adjacent the roller coater 20 and is provided with an actuating arm arranged to be biased by a sheet which is being fed into the roller coater but which has not cleared the conveyor 16. A slide member 42 is supported beneath and between the rollers 38 and 40 on a pair of ways 44 for reciprocation lengthwise of the conveyor 16. The member 42 is provided with a pair of upstanding lugs 46 and 48 upon which a pair of dogs 50 and 52 are mounted, respectively. The dog 50 is provided with a forwardly facing abutment shoulder 54 and a rearwardly and downwardly inclined cam surface 56, while the dog 52 is provided with a forwardly facing abutment shoulder 58 and a rearwardly and downwardly inclined cam surface 60. Each of the dogs 50 and 52 is provided with a rearward extension 62 and 64, respectively, which seats on the upper surface of the slide 42 and not only provides sufficient weight to maintain the dogs in the position shown, but prevents clockwise rotational movement of the dogs from the position in which they are illustrated. The slide 42 is connected at its forward end to the piston rod 66 of an air cylinder 68, which is adapted to supply power to reciprocate the slide 42 on its ways 44. One or the other of the dogs 50 and 52 will engage an end of a sheet lowered onto the conveyor 16 for the purpose of moving it onto the roller conveyor 20, as will be more fully explained below.

The transfer mechanism 14 includes a rocker frame or transfer arm 70 which is pivotally supported on a base frame 72. All of the frame members of the rocker frame 70 are of hollow tubular shape and are interiorly interconnected to provide a relatively large volume vacuum chamber which is connected to a vacuum pump 74 through a flexible conduit 76 fitted to a lower tubular frame member 78. The lower frame member 78 is provided with stub shafts 80 and 82 at its opposite ends which are journaled in pillow blocks 84 and 86 supported on the base frame 72. The rocker frame 70 additionally includes a pair of parallel spaced bent frame members 88 and 90 which are interconnected and braced by a central tubular cross frame member 92 and an upper end cross frame member 94. Each of the bent frame members 88 and 90 includes a lower straight section 96, a central elbow section 98 and an upper straight section 100 disposed at an acute angle to the lower section 96. As may be best seen in FIG. 3, the pivot axis of the rocker frame, which is defined by the stub shafts 80 and 82, is disposed below and generally midway between the centers of the conveyors 12 and 16 with the lower frame sections 96 spanning the width of the conveyor 16 beneath the same and the upper frame sections 100 being disposed above the conveyors and extending across the width of the conveyor 16 to a position disposed above the center of the conveyor 12 when the rocker frame is in the position shown in solid lines in FIG. 3.

Movement of the rocker frame 70 is effected by means of an air cylinder 102 which is pivotally connected at its lower end to a floor bracket 104 and is provided with a piston rod 106 carrying a clevis 108 at its outer end which is pivotally joined to a brace 110 fastened between the frame members 88 and 90. A hydraulic cylinder 112 is disposed adjacent to the cylinder 102 and is similarly pivotally connected to a floor bracket 114 and is provided with a piston rod 116 carrying a clevis 118 which is also pivotally connected with the brace 110. Communication between the opposite ends of the cylinder 112 is provided through a check valve 120 for the recirculation of the hydraulic fluid from one end of the cylinder 112 through the check valve 120 to the opposite end of the cylinder. The check valve meters the flow of fluid and provides a smooth and uniform rate of operation for the air cylinder 102 which, if uncontrolled, might otherwise operate in a somewhat jerky or excessively rapid manner.

Pivotally hung from the rocker frame cross member 94 adjacent the opposite end thereof are a pair of air cylinders 122 and 124. The cylinders 122 and 124 are provided with piston rods 126 and 128, respectively, carrying clevises 130 and 132 which are pivotally joined to the opposite ends of a channel member 134. A pair of suction cups 136 and 138 are fastened to the underside of the channel member 134 beneath the clevises 130 and 132. Each of the suction cups is provided with a downwardly presenting suction area which communicates with an extensible flexible conduit 140 and 142 which in turn are connected to a valve 144 mounted on the cross frame member 94 and communicating with the vacuum chamber formed within the rocker frame. The valve 144 thus controls the communication of the vacuum chamber with the vacuum cups 136 and 138 for the purpose of lifting and releasing the sheets of material.

Securely fastened to the cross frame member 94 adjacent the air cylinders 122 and 124 on the rear side thereof are a pair of angle iron members 146 and 148, each of which is provided with a pair of integrally joined nuts 150, each one of which serves to support the threaded shank 152 of an adjustable locating pad or abutment 154 having a rubber face 156. A locking nut 158 may be threaded onto each shank 152 and drawn tight against the nut 150 for locating the rubber face 156 in any desired position.

The rubber faces 156 of the abutment members 154 are adapted to bear against the air cylinders 122 and 124 for the purpose of limiting rearward swinging pivotal movement thereof when the rocker frame is moved to its retracted position, as indicated in broken lines in FIG. 3. Thus, when the rocker frame is moved to its retracted position with the air cylinders suspended over the conveyor 16, the air cylinders 122 and 124 will be held in a perfectly vertical position by the abutment members 154 and the workpiece carried thereby will be prevented from swinging beyond its intended position as a result of the momentum of the parts hung from the cross frame member 94. Fixed to the cross frame member 94 adjacent the cylinders 122 and 124 on the forward sides thereof are a pair of angle iron members 160 and 162, also carrying abutment members 154, which limit the forward swinging movement of the suction cups upon the movement of the rocker frame to its forward position and assure that the air cylinders will be maintained in a vertical position when the rocker frame is brought to rest in its forward position.

Sheets of material which have been deposited on the conveyor 16 are fed into the roller coater 20, and has been previously described. The roller coater 20 includes a pair of first vertically spaced rollers 164 and a second pair of vertically spaced rollers 166, both pairs being rotatably interconnected by spur gears 168 and both pairs of rollers being driven in rotation by a motor 170 and drive chain 172. The rollers 164 and 166 are covered with a suitable coating material which will be applied to the sheets passed therebetween. When a sheet is fed between the first pair of rollers 164 it will not only be coated with the material covering the surface of said rollers but, as a result of the engagement of the rollers on the opposite sides thereof, the sheet will be fed through the second pair of rollers 166 and thence onto the final roller conveyor 22. In this position, a sheet of material will depress the actuating arm of a limit switch LS1 which is positioned between two spaced rows of rollers 174 and 176 on which the work sheets rest for sliding movement along the conveyor. In FIG. 2, the conveyor 22 is illustrated as having a second position, at which location a sheet resting on the conveyor 22 will depress the actuating arm of a limit switch LS5. As will be hereinafter explained, the limit switch LS5 permits additional control of the depiling apparatus in response to the consumption of the sheets being depiled and assures that the sheets will not be depiled at any greater rate than they are needed.

The operation of the mechanism of the present invention will be best understood by reference to FIGS. 8, 9 and 10. In FIG. 8, a suitable electrical control circuit is illustrated in which conductors 178 and 180 are connected to the opposite side of a source of alternating electrical potential (not shown) upon the closure of a line switch S1. In describing the operation of the mechanism of the present invention, it will be first assumed that the rocker frame 70 is in a retracted position with its cups 136 and 138 raised and that the conveyors 16 and 22 are empty of sheets. In order to begin the transfer cycle, the machine operator first closes manual switches SW1, SW2, SW3 and SW4. It will be noted that when the rocker frame is in its retracted position, it will engage the actuating arm of limit switch LS6 and its contacts LS6a and LS6b will therefore be held open. Thus, no current will flow through switch SW1. However, the closure of switch SW2 is effective to energize relay R2 through either normally closed contacts R3b or normally closed limit switch LS9, thus causing closure of its contacts R2b and R2a. The closure of switch SW3 and contacts R2b establishes an energizing circuit for motor starter relay M2 through normally closed contacts R3c and R4b, provided that a pair of sheets is not in a position on the belt conveyor 12 opposite the transfer mechanism 16. The energization of relay M2 causes closure of its contacts M2a, M2b and M2c (FIG. 9) to deliver current to the belt conveyor motor 34 and thus drive the belts 30 and 32. By this means, a pile which has been placed onto the conveyor 16 will be moved therealong until it contacts the actuating arm of LS8. When this occurs, the contacts of limit switch LS8 will be closed to energize relay R4 and open normally closed contacts R4b. This interrupts the energizing circuit for relay M2 and deenergizes the motor 34, to cause the belts 30 and 32 to stop with the pile of workpieces in a proper position for unloading by the transfer mechanism 16.

Simultaneously with the movement of a pile into unloading position, the rocker frame 70 is moved from its retracted position to the forward position shown in solid lines in FIG. 3. This movement results from the energization of the coil of solenoid 3 by the closure of contacts R2a. Solenoid 3 is operatively connected to a valve 182 so as to deliver compressed air from a source of compressed air 183 to the cylinder 102 so as to move the piston rod 106 thereof in an upward direction. As the rocker frame 70 moves forwardly, it disengages from limit switch LS6 and ultimately contacts the actuating arm of limit switch LS7 when it has reached its forward position, thereby closing the contacts of LS7. The contacts LS6a, which now close, complete a circuit through switch SW1 and the contacts of limit switch LS5 to energize motor starter relay M1. The energization of relay M1 causes closure of its contacts M1a, M1b and M1c (FIG. 9) to deliver three-phase current to the roller coater motor 170 to drive the rollers 164 and 166.

After the pile on the conveyor 12 has reached its proper position and the contacts of limit switch LS8 have been closed, relay R4 will be energized to close its contacts R4a and complete a circuit through solenoid 1. Solenoid 1 is operatively connected to a valve 184 and when energized moves the spool of valve 184 in a direction admitting compressed air from the compressed air source 183 to the cylinders 122 and 124 in a direction effecting the descent of piston rods 126 and 128. When the suction cups make contact with the top sheet on the pile, limit switch LS4 will be closed to energize relay R3. The energization of relay R3 opens its normally closed contacts R3a to interrupt the circuit which energizes solenoid 1, thereby permitting the valve 184 to spring return to a position directing compressed air to the bottom of cylinders 122 and 124 and causing the piston rods 126 and 128 to be raised. It should be noted that if for any reason the suction cups 136 and 138 fail to hold the sheet and the sheet is dropped back down onto the pile, limit switch LS4 will be opened to cause the suction cups to again descend onto the top of the pile and pick up the piece which has been dropped. When the suction cups and piston rods are fully retracted, the channel member 134 will engage limit switch LS9 to cause its contacts to open. In the meantime, contacts R3b will have been opened by the energization of relay R3 and contacts R5a and limit switch LS2 remain in their normally open positions. Thus, the circuit energizing relay R2 is interrupted. The deenergization of relay R2 causes the opening of contacts R2a and thus the deenergization of solenoid 3. Deenergization of solenoid 3 permits the spool of valve 182 to spring return to a position in which compressed air is delivered to the cylinder 102 in a direction causing retracted downward movement of the piston rod 106. The rocker frame 70 is thus moved to its rearward position as illustrated in broken lines in FIG. 3. In so doing, it permits limit switch LS7 to open and contacts limit switch LS6 to close its contacts LS6a and LS6b. The opening of contacts LS6a terminates operation of the roller coater motor 170, while the opening of contacts LS6b deenergizes solenoid 2, which operates the vacuum control switch 144 and admits atmosphere to the vacuum cups 133 and 138, thereby releasing the sheet held by said vacuum cups and permitting it to drop onto the conveyor 16. As the workpiece drops onto the conveyor 16, it contacts limit switch LS3, the actuating arm of which projects above the rows of rollers 38 and 40 to cause its contacts to close and thus energize relay R5. When relay R5 is energized, its contacts R5a and R5b close. A circuit is now completed through switch SW2 and contacts R5a to energize relay R2. This produces closure of contacts R2a and establishes an energizing circuit for solenoid 3 which shifts valve 182 to a position in which air is admitted to the cylinder 102 in a direction extending the piston rod 106 and causing forward rocking movement of the rocker frame 70. As soon as the rocker frame 70 begins its forward movement and moves out of contact with the limit switch LS6, the contacts LS6a will close to establish an energizing circuit for relay R1 through switch SW1, limit switch LS1 and the now closed contacts R5b. The energization of relay R1 produces closure of the contacts R1a thereof to energize solenoid 4 which is operatively connected to a valve 188 which is connected to cylinder 68. The energization of solenoid 4 operates valve 188 to admit air to the cylinder 68 in a direction causing movement of the piston rod 66 in a left-hand direction, as viewed in FIG. 4. The dog 50 is thus moved into engagement with one end of the sheet resting on the conveyor 16 and pushes the sheet into the roller coater. In the event that a particularly long sheet is being handled, one end thereof will have come to rest on the dog 50, pivoting it downwardly. In this event, the dog 52 will engage the sheet and serve in place of the dog 50. The rolls of the roller coater which were again driven in rotation upon the closure of limit switch contacts LS6a, grasp the sheet and draw it through the roller coater. As the sheet moves out of engagement with limit switch LS3, relay R5 is deenergized to cause its contacts R5b to open, thereby deenergizing the relay R1, which causes its contacts R1a to open. This breaks the energizing circuit to solenoid 4 and permits the valve 188 to spring return to a position in which compressed air is admitted to the cylinder 68 in a direction causing the piston rod 66 to move in a right-hand direction, as viewed in FIG. 4, thereby positioning the slide 18 out of alignment with the position on the conveyor 16 onto which sheets are dropped by the transfer mechanism 14.

The transfer cycle continues to operate in the cycle previously described except that the limit switch LS8, being held closed by the presence of the stack in unloading position on the conveyor 12, keeps the relay R4 energized to prevent energization of the conveyor motor relay M2. In the event that a sheet has failed to clear the conveyor 16 by the time that the rocker frame has lifted a sheet off of the stack and is ready to retract, the sheet which is on the conveyor 16 will hold the limit switch LS2 closed to establish an energizing circuit for relay R2, bypassing the limit switch LS9, thereby maintaining the contacts R2a closed and continuing the energization of solenoid 3 to prevent the rocker frame from moving a new sheet over the conveyor 16. Limit switches LS1 and LS5 also serve a regulating function. In the event that both of these limit switches are held open by the presence of sheets on the conveyor 22, the circuits for relays R1 and M1 will be interrupted and the solenoid 4 will be prevented from being energized, thereby preventing the movement of the dog slide 18 and also preventing the operation of the roller coater motor 170. From the foregoing, it will be seen that the operation of the mechanism of the present invention is such as to provide for the automatic and successive depiling of a stack of sheet material as rapidly as a receiving station is in a condition ready to receive the sheets. Furthermore, the conveyor 12 will be automatically operated to advance successive stacks of sheets into a position in which they are adapted to be depiled by the transfer mechanism 14. Furthermore, it will be seen that the shape and arrangement of the transfer mechanism 14 is such as to occupy a minimum of floor space over and above that required by the conveyor. The frame member 70 is so supported that a minimum amount of energy is needed to rock the frame between its two positions. This largely results from the fact that the weight of the frame and the sheet carried thereby is very nearly balanced over the pivot axis of the rocker frame throughout the extent of the movement of the rocker frame. In addition, the sheet travels in a relatively flat arc as the rocker frame is moved and thus the level of the sheet remains substantially unchanged from one position of the rocker frame to the other. It will also be appreciated that the tubular framework of the rocker frame provides a convenient and highly advantageous method for connecting the vacuum pump to the suction cups. The suction cups, which are preferably made from a flexible rubber material, are such as to tightly engage the sheets around the periphery thereof and in practice it has been found that a pair of vacuum cups is able to lift an extremely heavy piece of sheet steel without difficulty.

A suitably high vacuum level is maintained within the rocker frame 70 by means of a pressure responsive switch 180 which is tapped into the cross frame member 78. The switch 186 is provided with contacts 186a which are normally closed to energize a motor starter relay M3, thereby maintaining its contacts M3a, M3b and M3c closed to deliver current to a vacuum pump motor 190 which operates the vacuum pump 74. When the vacuum level within the rocker frame 70 reaches a suitably high level, the contacts 186a will be opened to deenergize relay M3 and thus deenergize motor 190. Thus, the motor 190 is only operated when a need for a higher vacuum level exists.

While it will be apparent that the preferred embodiment herein illustrated is well calculated to fulfill the objects above stated, it will be appreciated that the invention is susceptible to modification, variation and change without departing from the proper scope or fair meaning of the subjoined claims.

What is claimed is:

1. A transfer mechanism including two adjacent supporting surfaces, a transfer arm having a lower section extending upwardly under one of said supporting surfaces and beyond the outside edge thereof and an upper section extending upwardly and inwardly toward a midplane extending between said supporting surfaces so as to be alternatively positionable over one or the other of said supporting surfaces, work engaging and supporting means on said upper section, and means for rocking said transfer arm to position said work engaging and supporting means selectively over said supporting surfaces.

2. A transfer mechanism including two adjacent supporting surfaces, a transfer arm having a lower section extending upwardly under one of said supporting surfaces and beyond the outside edge thereof and an upper section extending upwardly and inwardly toward a midplane extending between said supporting surfaces so as to be alternatively positionable over one or the other of said supporting surfaces, a lifting mechanism pivotally suspended from said upper section for engaging and lifting pieces of material, and means for rocking said transfer arm between a position in which said lifting mechanism is disposed over one of said supporting surfaces and a position in which said lifting mechanism is disposed over the other of said supporting surfaces.

3. The structure set forth in claim 2 including means fixedly secured to said upper section engageable with said lifting mechanism for limiting pivotal swinging movement thereof upon movement of said rocker frame between said positions.

4. A transfer mechanism including two adjacent supporting surfaces, a transfer arm having a lower section extending upwardly under one of said supporting surfaces and beyond the outside edge thereof and an upper section extending upwardly and inwardly toward a midplane extending between said supporting surfaces so as to be alternatively positionable over one or the other of said supporting surfaces, a lifting mechanism pivotally suspended from said upper section for engaging and lifting pieces of material, a pivotal support for said transfer arm disposed beneath the level of said supporting surfaces, and a power cylinder having a piston rod connected to said lower section for rocking said tranfser arm between a position in which said lifting mechanism is disposed over one of said supporting surfaces and a position in which said lifting mechanism is disposed over the other of said supporting surfaces.

5. A transfer mechanism including two adjacent supporting surfaces, a transfer arm having a lower section extending upwardly under one of said supporting surfaces and beyond the outside edge thereof and an upper section extending upwardly and inwardly toward a midplane extending between said supporting surfaces so as to be alternatively positionable over one or the other of said supporting surfaces, said transfer arm having hollow tubular frame elements defining portions of said upper and lower sections and providing a fluid chamber, a downwardly facing suction cup pivotally suspended from said upper section for vertical movement relative thereto, a vacuum pump connected to said fluid chamber, and means connecting said fluid chamber to said suction cup whereby air may be evacuated therefrom through said transfer arm.

6. A transfer mechanism including two adjacent supporting surfaces, a transfer arm having a lower section extending upwardly under one of said supporting surfaces and beyond the outside edge thereof and an upper section extending upwardly and inwardly toward a midplane extending between said supporting surfaces so as to be alternatively positionable over one or the other of said supporting surfaces, a lifting mechanism pivotally suspended from said upper section and having a suction cup adapted to engage and lift a sheet of material on one of said supporting surfaces, a limit switch carried by said lifting mechanism actuated by a sheet of material in engagement with said suction cup, a control circuit for said transfer arm including said limit switch operable to cause said lifting mechanism to return to pick up a piece of material dropped by said suction cup prior to the normal full lifting cycle of said lifting mechanism, and means for rocking said rocker frame between a position in which said lifting mechanism is disposed over one of said supporting surfaces and a position in which said lifting mechanism is disposed over the other of said supporting surfaces.

References Cited in the file of this patent

UNITED STATES PATENTS

| 1,619,507 | Grandstedt | Mar. 1, 1927 |
| 2,579,094 | Rooksby | Dec. 18, 1951 |
| 2,819,806 | Vieth | Jan. 14, 1958 |
| 2,928,519 | Finston | Mar. 15, 1960 |